United States Patent [19]

Campbell

[11] Patent Number: 4,736,765
[45] Date of Patent: Apr. 12, 1988

[54] HYDRANT SECURING DEVICE

[75] Inventor: Marc Campbell, Willowdale, Canada

[73] Assignee: Camline Services & Supplies Incorporated, Willowdale, Canada

[21] Appl. No.: 34,603

[22] Filed: Apr. 6, 1987

[51] Int. Cl.$^4$ .............................................. F16K 35/06
[52] U.S. Cl. .................................... 137/296; 137/382; 220/85 P; 220/214; 248/551
[58] Field of Search ............... 137/272, 296, 371, 377, 137/381, 382; 220/85 P, 214, 284; 248/551

[56] References Cited

U.S. PATENT DOCUMENTS

| | | | |
|---|---|---|---|
| 565,013 | 8/1896 | Moodie | 137/296 |
| 2,118,233 | 5/1938 | Ruggio | 137/296 |
| 2,699,176 | 1/1955 | Ucciardi | 137/296 |
| 2,869,576 | 1/1959 | Kennedy | 137/296 |
| 3,379,209 | 4/1968 | Spiselman | 137/296 |
| 3,756,450 | 9/1973 | Crose, Jr. | 220/85 P |
| 4,033,372 | 7/1977 | Bowman | 137/296 |
| 4,478,345 | 10/1984 | Edinger | 220/85 P |

FOREIGN PATENT DOCUMENTS

| | | | |
|---|---|---|---|
| 683,937 | 10/1939 | Fed. Rep. of Germany | 137/296 |
| 811384 | 4/1937 | France | 137/296 |

*Primary Examiner*—George L. Walton

[57] ABSTRACT

A hydrant securing device is adapted for use on a conventional fire hydrant having an exposed upper valve nut and a pair of caps each formed with a cap nut. The device preferably comprises a one-piece steel yoke having a generally U-shaped configuration dimensioned for seating directly on the valve and cap nuts. The yoke has a a generally horizontal base formed with an opening dimensioned for location about the valve nut, and a pair of downwardly-directed arms, each arm having an opening dimensioned for location about one of the cap nuts. The openings conform generally to the shape of the nuts and prevent rotation of the nuts relative to the yoke so that the caps cannot be removed and water flow cannot be initiated. The yoke is sufficiently resilient that the arm portions can be elastically separated to permit simultaneous location of the openings about the valve and cap nuts and to permit removal of the hydrant securing device in the event of a fire. Each arm has a strap guide formed by displacing a portion of metal from the associated arm to define a passage between the metal portion and the associated arm. A steel strap clamp is extended through the strap guide passages and crimped to prevent separation of the yoke arms and removal of the device. The strap clamp is snapped with a wrench or other prying tool when access to the hydrant is required.

11 Claims, 2 Drawing Sheets

HYDRANT SECURING DEVICE

FIELD OF THE INVENTION

The invention relates to the securing of fire hydrant valves and caps against tampering and also to detection of unauthorized use of a fire hydrant.

DESCRIPTION OF THE PRIOR ART

To the knowledge of the inventor, no satisfactory and cost-effective means have been provided for securing the water valve and caps associated with a conventional fire hydrant. The valve nut associated with such a hydrant is normally exposed and can be rotated with an appropriate wrench to actuate water flow within the hydrant. The caps which cover water outlets normally formed on either side of a fire hydrant are also provided with exposed nuts and may also be removed with a wrench.

To prevent theft of the outlet caps, it is common practice to chain the caps directly to the body of the hydrant. In U.S. Pat. No. 489,329 to Rosse, however, there is described an alternative mechanism for securing a hydrant cap. This mechanism includes a bar with slots formed at either end, a lower end of the bar being pivotally connected to the body of the hydrant with a threaded fastener, the upper end of the bar being attached to a hydrant cap with another threaded faster in a manner which permits rotation of the cap itself. The Rosse device permits the cap to be opened and pivoted away from the associated water outlet without entirely disengaging the cap from the hydrant. Such a mechanism does not, however, preclude unauthorized use of the hydrant or even theft of the caps themselves.

A much more significant aspect of hydrant tampering is actuation of the internal water valve associated with a hydrant without actual discharge of water. In environments subject to very cold winters, the flow valve actuated by the exposed hydrant valve nut may normally be located several feet below ground level where freezing of hydrant components is unlikely to occur, and the interior of above-ground hydrant housing portions may normally be kept dry. If only the valve nut is tampered with, there may be no visual indication that the hydrant is water-filled and that the hydrant is apt to rupture in cold weather with freezing and expansion of the contained water. A municipality or other authority may consequently be required to conduct a very costly annual inspection of hydrants, one involving actual opening of each hydrant for purposes of detecting the presence or absence of water.

In view of the number of fire hydrants located, for example, in a major city, it would be desirable to provide an inexpensive mechanism by means of which a hydrant may be conveniently secured against tampering, particularly tampering with a valve nut responsible for regulating water flow within the hydrant. It would also be desirable that such a securing mechanism be easily and quickly removed in the event of a fire to permit quick access to the hydrant. If tampering with the valve nut has occurred, it would be desirable that such a device visually indicate such tampering so that inspection procedures are greatly simplified. Accordingly, it is an object of this specification to provide a hydrant securing device which in preferred form meets such requirements.

BRIEF SUMMARY OF THE INVENTION

In one aspect, the invention provides a device for securing a hydrant having at least three nuts which can be rotated to open hydrant valves or outlets. The device includes means which seat on the hydrant to define a generally U-shaped structure contacting each of the three nuts. The U-shaped structure has nut locking means which locate about the three nuts to prevent rotation of the three nuts. Accordingly, the nuts cannot be rotated for the purposes of initiating water flow or removing outlet caps without removing the device. The U-shaped structure is removed from the hydrant only by displacing portions of the generally U-shaped structure relative to one another. Securing means are provided which prevent such relative displacement of the structure portions, these securing means preferrably being in the form of a metal strap clamp which cannot be casually released and whose removal provides a visual indicator of hydrant tampering.

In another aspect, the invention provides a device for use in securing a hydrant of the type having an exposed valve nut and a pair of opposing side outlet caps, each cap being threaded onto a hydrant outlet and having a cap nut by means of which the cap can be rotated relative to the housing outlet. The device comprises a one-piece yoke having a generally U-shaped configuration including a base portion and a pair of opposing arm portions. The yoke has a passage formed in the base portion and dimensioned to locate about the valve nut, another passage formed in one arm portion and dimensioned to locate about one cap nut and yet another passage formed in the other arm portion and dimensioned to locate about the other cap nut. The passages are positioned for simultaneous location about the valve and cap nuts, each passage being shaped to prevent rotation of the associated nut relative to the yoke when so located. The yoke is formed of a material sufficiently resilient that the arm portions can be elastically separated to permit the simultaneous location of the passages about the associated valve and cap nuts and to permit removeal of the passages from the associated valve and cap nuts. Securing means acting between the arm portions prevent separation of the arm portions and consequently casual removal of the device from the hydrant.

Other inventive features and associated advantages will described more fully below in connection with the description of a preferred embodiment of a hydrant securing device and various inventive aspects will be more specifically defined in the attached claims.

DESCRIPTION OF THE DRAWINGS

The invention will be better understood with reference to drawings illustrating a preferred embodiment, in which.

DESCRIPTION OF PREFERRED EMBODIMENT

Figure 1:
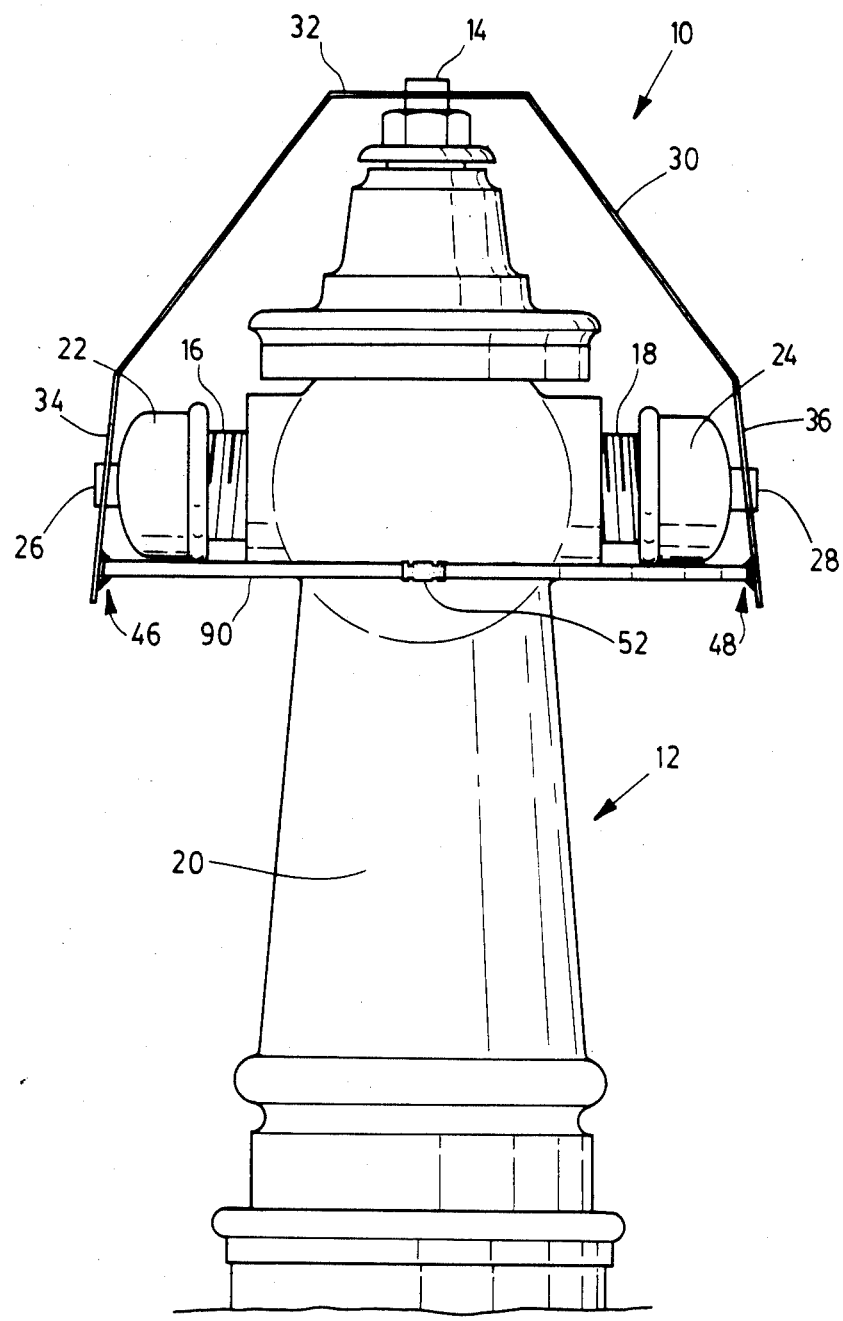
FIG. 1 is an elevational view of a conventional fire hydrant on which is mounted a hydrant securing device.
Figure 2:
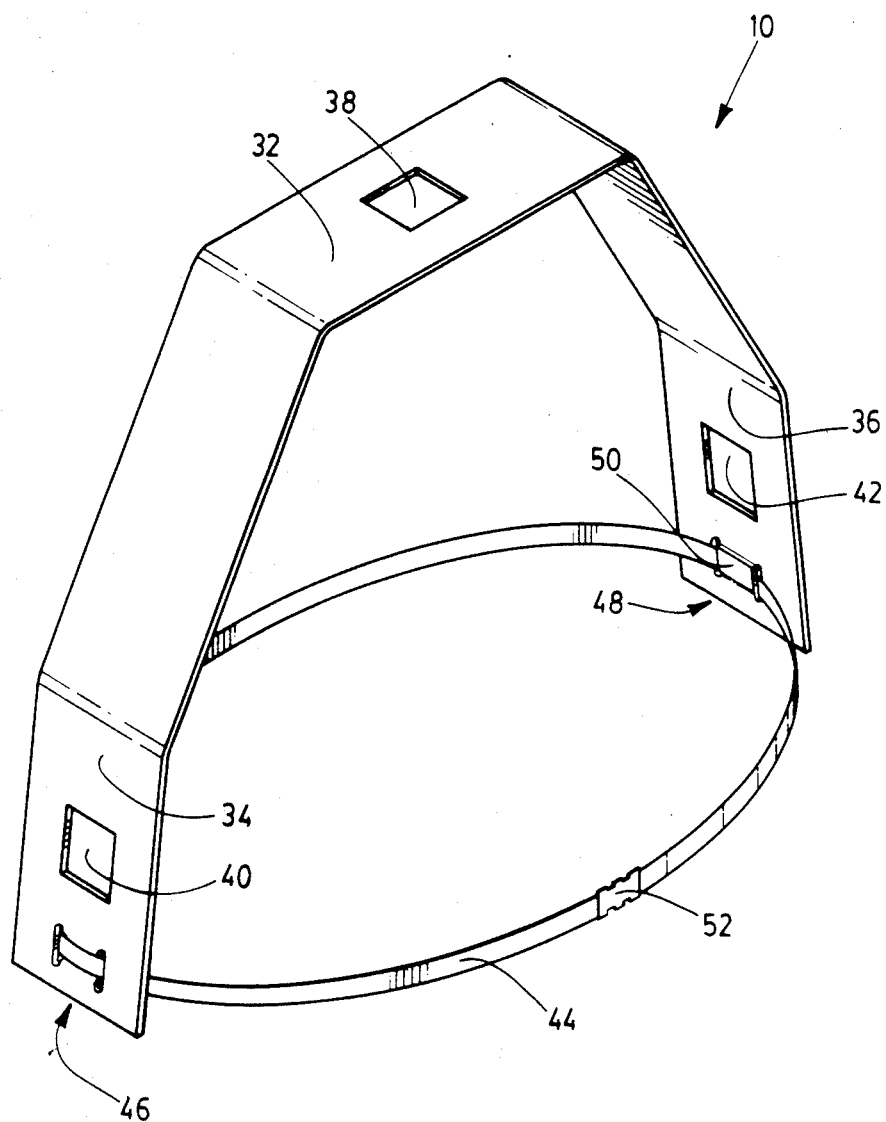
FIG. 2 is a perspective view of the hydrant securing device.

Reference is made to FIG. 1 which illustrates a hydrant securing device 10 mounted on a fire hydrant 12. The hydrant 12 is of a very common variety which has an upper exposed valve nut 14 which can be rotated about a vertical axis to open an internal water control valve. The hydrant 12 also has a pair of water outlets 16, 18 positioned on opposing sides of the hydrant housing 20. A pair of outlet caps 22, 24 are threaded onto the water outlets 16, 18 essentially closing the outlets 16, 18 against the escape of water. The caps 22, 24 have cap nuts 26, 28 by means of which each cap can be rotated relative to the housing outlets 16, 18 for removal. In this particular hydrant 12, the cap nuts 26, 28 are rotated about substantially a common horizontal axis with an appropriate wrench. Although the invention will be described in the context of such a hydrant, it should be understood that other hydrants can be accommodated with appropriate modification of the devices taught in this disclosure and that the invention should not be construed as limited to hydrant securing devices appropriate solely for this particular type of hydrant.

The hydrant securing device 10 includes a one-piece yoke 30 formed of an elongate steel plate bent to having a generally U-shaped configuration. The yoke 30 may be seen to comprise a generally horizontal base portion 32 and a pair of opposing, downwardly-extending arm portions 34, 36. The yoke 30 has a passage 38 die-cut in the base portion 32 (prior to bending) and dimensioned for location about the valve nut 14. A similar passage 40 is formed in one arm portion 34 and dimensioned to locate about the cap nut 26 while a registered passage 42 is formed in the other arm portion 36 and dimensioned to locate about the other cap nut 28. These passages are positioned on the yoke 30 such that they may be simultaneously located about the valve and cap nuts as illustrated in FIG. 1, in a manner described more fully below. Each passage conforms roughly in shape and dimensions to the associated nut, and consequently, when the yoke 30 is seated on the hydrant 12 with each passage located about the respective nut, the nuts cannot be rotated relative to the yoke 30 (and more specifically relative to the hydrant housing 20) to actuate water flow or to permit removal of the outlet caps 22, 24.

Although the passages in the yoke 10 are defined by simple punched holes conforming to the shape of the nuts, other means may be used to lock the one or more of the nuts against rotation. For example, suitable passages preventing relative rotation of the nuts relative to the yoke 10 itself might be defined by tubular projections which completely encircle each nut or by projections which define passages that are largely open, but sufficient to physically obstruct rotation of the nuts. It is also within the ambit of the present invention to lock the nuts against rotation by providing locking means which simply obstruct tool access to the nuts, as for example, housing which are positioned to conceal the nuts either partially or totally.

The steel material of the yoke 30 is sufficiently resilient that the arm portions 34, 36 can be elastically separated to permit simultaneous location of the passages about the associated valve and cap nuts. To locate the yoke 30 on the hydrant 12, the passage 40 of the arm portion 34 may be located about the cap nut 26, the other arm portion 36 may be deflected away from the arm portion 34 to permit the passage 38 in the base portion 32 to be located about the valve nut 14, and then released to locate the passage 42 associated with the arm portion 36 to locate about the cap nut 28. The yoke 30 will then be seated solely on the valve and cap nuts in much the configuration illustrated in FIG. 1. To remove the yoke 30 from the hydrant 12, as to access the cap and valve nuts, the arm portion 36 may once again be displaced elastically away from the other arm portion 34, and the steps of the mounting procedure reversed. It will be appreciated that this arrangement permits the device 10 to be quickly installed and, perhaps more critically, very quickly removed.

The yoke 30 can be removed from the hydrant 12 only by relative displacement of the two arm portions 34, 36. The yoke 30 is secured against casual removal by means of a circular metal strap clamp 44 of the type commonly used to secure large cargo boxes and the like. To that end, the arm portions 34, 36 are formed with strap guides 46, 48 which serve to properly locate and retain the strap clamp 44. The strap guide 48 associated with the arm portion 36 is typical. The strap guide 48 is formed by displacing a portion 50 of metal (as during a die-cutting operation before bending of the metal plate constituting the yoke 30) from the associated arm portion 36 to define a passage (illustrated but not indicated) between the metal portion 50 and the associated arm portion 36. Once the yoke 30 is installed on the three hydrant nuts, the strap clamp 44 can be extended through the strap guides 46, 48, tightened with a conventional apparatus appropriate for such purposes and the ends of the strap clamp 44 crimp-fastened with a conventional fastener 52. The fastener 52 may be sprayed with an appropriate paint to give a visual indication whether someone has surreptitiously tampered with the strap clamp 44, as by loosening then re-engaging the fastener 52.

To remove the yoke 30, it is first necessary to break the strap clamp 44. This can be done by inserting the handle of the wrench commonly used to operate the valve and cap nuts between one of the housing outlets 16, 18 and the strap clamp 44 itself. The wrench may then be pivoted downwardly using the hydrant housing 20 as a fulcrum point to snap the strap clamp 44.

A major problem with hydrants, as mentioned above, is undetected actuation of the internal water flow valve. If the hydrant caps have not been removed, the tampering may not be apparent, and there is no indication that the hydrant housing is in fact full of water. In most instances, vandals may be expected to remove the strap clamp 44 or yoke 30 of the device 10 in its entirety so that tampering will be readily apparent. An inspector can be reasonably satisfied that if the securing device 10 is properly seated on the hydrant 12, the valve nut 14 has not been rotated. If the securing device 10 has been removed, or the strap clamp 44 interfered with, there is a visual indication of tampering. This very significantly simplifies the inspection of hydrants and significantly reduces associated labour costs. In this aspect of the invention, it will be apparent that securing of the outlet caps 22, 24 themselves is not essential, and that the advantages described could be obtained even if the passages 40, 42 were not dimensioned or shaped to prevent rotation of the cap nuts 26, 28.

It will be appreciated that a particular hydrant securing device has been described for purposes of illustrating the principles and features of the invention and that modifications may be made therein without departing from the spirit of the invention or the scope of the appended claims.

In particular, it should be noted that the one-piece, die-cut and bent yoke 30 represents a particularly inexpensive way of constructing the generally U-shaped structure required to simultaneously lock the three nuts associated with a hydrant such as the hydrant 12. The elasticity of the constituent metal is relied upon to permit the relative separation of the portion of the U- shaped structure necessary to permit installation and removal. However, it is fully within the ambit of the invention to form the U-shaped structure by providing a hinge joint for example at the base portion of the U-shaped which permits one arm portion to pivot relative to theother thereby permitting the required relative separation. In fact, the U-shaped structure may be formed by a plurality of components: for example, one arm portion can be terminated at an upper end with a perpendicular tab which inserts into a slot formed in the base portion, thereby defining a separable hinge joint that permits the requied simultaneous location about the valve and cap nuts. Such a device would comprise two completely separate elements prior to installation and subsequent to removal but would define a U-shaped structure when seated on the hydrant itself. The part of the U-shaped structure may alternatively be adapted to interlock when seated on the hydrant. These are only particular examples of alternative arrangements and other arrangements within the ambit of the present invention are possible.

In hydrants having more than two hydrant outlets, a somewhat rarer form of hydrant, additional downwardly-extending arm portions may be attached to the U-shaped structure to accommodate the additional outlets. If formed of an appropriate resilient material or hinged, these may be conveniently located about the additional cap or valve nuts to be secured. The strap clamp securing means described herein may be extending around all such arm portions to prevent removal of the hydrant securing device. Such arrangements and equivalents thereof are regarded as coming within the ambit of the present invention as claimed.

Strap clamps have been described as appropriate menas for securing the portions of the U-shaped structure against relative separation. These are preferred for reasons of low-cost and simplicity of manufacture and use, and are regarded as suitable for most applications. However, the securing means may be made more complex and more difficult to overcome if this is deemed advisable. For example, one might attach hinged horizontal arms to the arm portion 34 which can be pivoted into contact with the arm portion 36 and which carry transverse hinged plates that locate against the outer surface of the arm portion 36. One transverse plate might comprise an eye-loop and the other, a slot which receives the eye-loop. Accordingly, a padlock may be inserted into the eye-loop to lock the two horizontal arms and to provide a more positive mechanism against separation of the arm portions of the yoke and removal of the hydrant securing device. Such measures are more costly and also do not lend themselves to as rapid removal of the hydrant securing device in the event of a fire. These might be considered in neighbourhoods where vandals would be expected to go to greater lengths to tamper with a hydrant. Once again, the use of such hinged arms and a padlock represents only one possible alternative to the strap clamp securing means suggested herein, and other alternatives may be used which come within the ambit of the invention.

I claim:

1. A device for use in locking a hydrant having an exposed valve nut and a pair of opposing side outlet caps, each cap being threaded onto a hydrant outlet and having a cap nut be means of which the cap can be rotated relative to the housing outlet, the device comprising:

a one-piece yoke having a generally U-shaped configuration including a base portion and a pair of opposing arm portions, the yoke having a passage formed in the base portion and dimensioned to locate about the valve nut, a passage formed in one arm portion and dimensioned to locate about one cap nut and a passage formed in the other arm portion and dimensioned to locate about the other cap nut, the passages being positioned for simultaneous location about the valve and cap nuts, each passage being shaped to prevent rotation of the associated nut relative to the yoke;

the yoke being formed of a material sufficiently resilient that the arm portions can be elastically separated to permit simultaneous location of the passages about the associated valve and cap nuts and removal of the passages from the associated valve and cap nuts;

securing means acting between the arm portions for preventing separation of the arm portions.

2. A hydrant securing device as claimed in claim 1 in which the yoke is formed of an elongate metal plate bent to the generally U-shaped configuration and having the passages cut herein.

3. A hydrant securing device as claimed in claim 1 in which the securing means comprise a strap clamp.

4. A hydrant securing device as claimed in claim 2 in which a strap guide is formed in each of the arm portions, each strap guide comprising a portion of metal displaced from the associated arm portion to define a passage between the metal portion and the associated arm portion.

5. A device for use in locking an exposed valve nut associated with a hydrant against rotation, the hydrant having a pair of opposing side outlet caps, each cap being threaded onto a hydrant outlet and having a cap nut by means of which the cap can be rotated relative to the housing outlet, the device comprising:

a one-piece member having a generally U-shaped configuration including a base portion and a pair of opposing arm portions, the one-piece member having a passage formed in the base portion and dimensioned to locate about the valve nut, a passage formed in one arm portion and dimensioned to locate about one cap nut and a passage formed in the other arm portion and dimensioned to locate about the other cap nut, the passage associated with the base portion being dimensioned to prevent rotation of the valve nut relative to the one-piece member when located about the valve nut, the passages being positioned for simultaneous location about the valve nut and the cap nuts;

the one-piece member being formed of a material sufficiently resilient that the arm portions can be elastically separated to permit simultaneous location of the passages about the associated valve and cap nuts such that the one-piece member is fixed against movement relative to the hydrant and to permit disengagement of the valve and cap nuts from the associated passage;

securing means acting between the arm portions for preventing separation of the arm portions.

6. A device as claimed in claim 5 in which the one-piece member is formed of an elongate metal plate bent to the generally U-shaped configuration.

7. A device as claimed in claim 5 in which the securing means comprise a strap clamp.

8. A device as claimed in claim 7 in which a strap guide is formed in each of the arm portions, each strap guide comprising a portion of metal displaced from the associated arm portion to device a passage between the metal portion and the associated arm portion.

9. A device for use in securing an exposed valve nut associated with a fire hydrant against rotation, the exposed valve nut being one of a plurality of vlave or cap nuts associated with the fire hydrant comprising:

means defining a locking structure which seats directly on each of the plurality of hydrant nuts and has a plurality of passages which receive each of the plurality of hydrant nuts when seated, the passage receiving the valve nut being shaped to prevent rotation of the valve nut being shaped to prevent rotation of the valve nut relative to the structure, the structure being removable from the hydrant by displacing opposing end portions of the structure relative to one another; and securing means acting directly between the structure end portions for preventing relative displacement of the structure end portions so that the structure is locked to the hydrant.

10. A device as claimed in claim 9 in which the structure is a one-piece member formed of a material sufficiently resilient that the opposing end portions can be displaced elastically relative to one another to permit location of the passages about the plurality of nuts and to permit disengagement of the plurality of nuts from the passages and removal of the structure from the hydrant.

11. A device as claimed in claim 10 in which the securing means comprise a strap clamp.

* * * * *